INVENTOR.
HIRAM E. TEMPLE

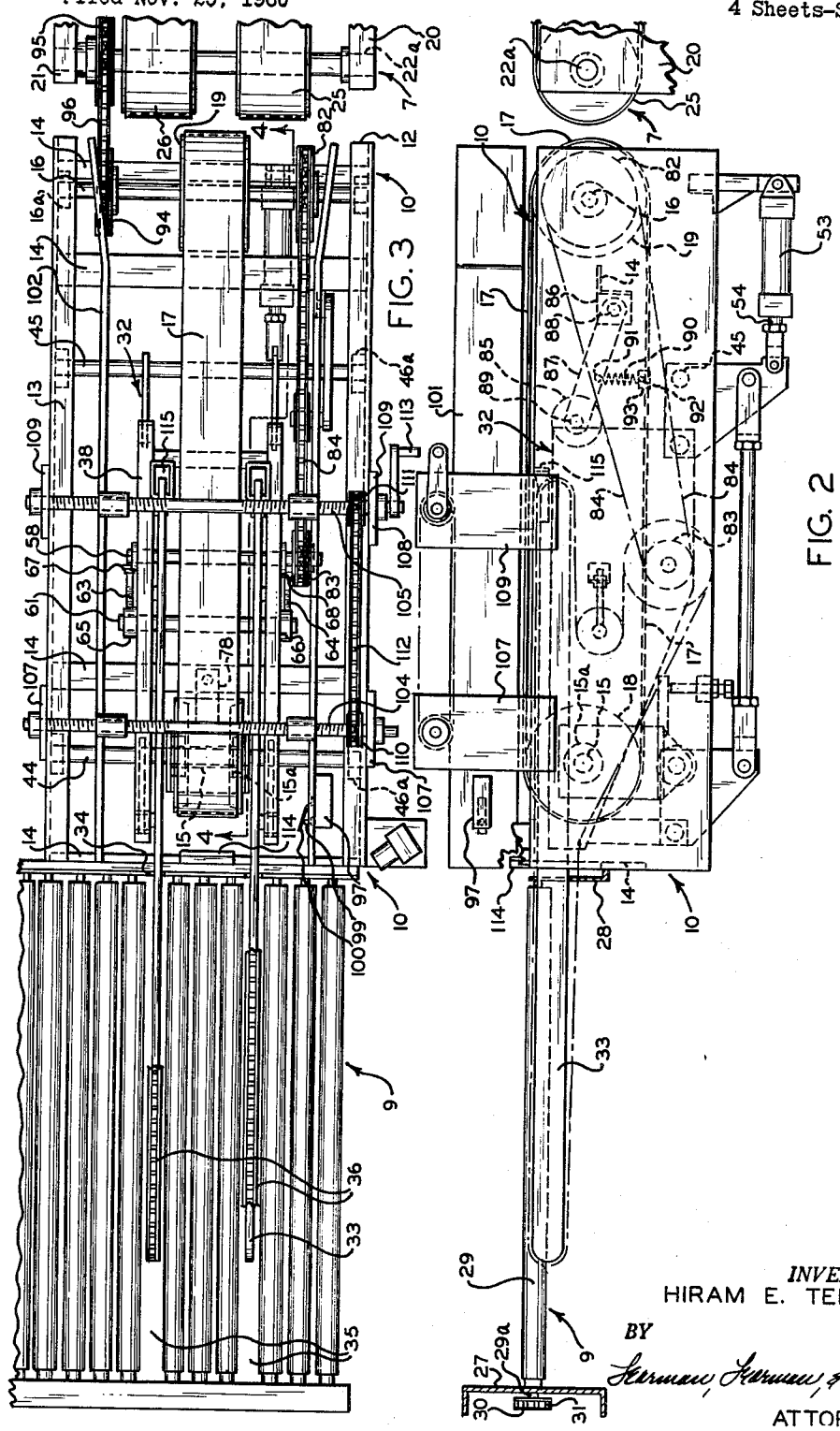

INVENTOR.
HIRAM E. TEMPLE

Oct. 29, 1963  H. E. TEMPLE  3,108,677
PAN TRANSFER APPARATUS
Filed Nov. 25, 1960  4 Sheets-Sheet 4

INVENTOR.
HIRAM E. TEMPLE
BY
ATTORNEYS

United States Patent Office 3,108,677
Patented Oct. 29, 1963

3,108,677
PAN TRANSFER APPARATUS
Hiram E. Temple, Saginaw, Mich., assignor to Baker Perkins Inc., Saginaw, Mich., a corporation of New York
Filed Nov. 25, 1960, Ser. No. 71,727
17 Claims. (Cl. 198—21)

This invention relates to transfer apparatus for moving articles such as pans of dough from one path of travel to a path of travel extending crosswise thereto, and more particularly to certain novel and useful improvements in transfer apparatus of this character, wherein the pans are deposited in alignment on a continuously operating crosswise conveyor in a manner so that they move away in alignment.

It is a primary object of the present invention to design transfer apparatus for gently moving pans or pan sets of dough and the like from one or more conveyors proceeding in one direction to a second conveyor leading perpendicularly therefrom and having a portion disposed ahead of the first mentioned conveyor or conveyors. The transfer system which will be described is designed for use between a molder and proofer, for instance, or between another unit and an oven, and is characterized by a positive control of the pans throughout the transfer operation with no dependence at any time on the forces of gravity. The pan sets are elevated, moved forwardly, and lowered to moving surface portions of the receiving conveyor in a smooth manner with the bottom surfaces of the pans engaging the receiving conveyor simultaneously so that the pan sets are carried away in the same relative position to the receiving conveyor that they are presented.

A further object of the invention is to provide transfer apparatus of the character described which is extremely easy on the pans and does not damage them and, further, is so designed as to insure against jamming of the pans on the receiving conveyor.

Another object of the invention is to design a system of the type described in which a plurality of infeed conveyors can transfer pans to a single receiving conveyor so that the maximum capacity of the proofer or oven which the receiving conveyor supplies may be utilized.

A further object of the invention is to provide transfer apparatus for moving pans or the like from an infeed conveyor, which presents them in one position or alignment to a receiving conveyor lying athwart the path of travel of the delivery conveyor, the receiving conveyor presenting them in a different position or alignment to the unit which it supplies.

Another object of the invention is to provide a transfer apparatus, including a conveyor system with infeed and receiving conveyors arranged angularly one to another, which can operably accommodate pans of various lengths.

Still a further object of the invention is to design right angle transfer apparatus of reliable and durable character which can be economically manufactured and assembled.

Other objects and advantages of the invention will be pointed out specifically or will become apparent from the following description when it is considered in conjunction with the appended claims and the accompanying drawings, in which:

FIGURE 2 is an enlarged side elevational view with the transfer conveyors being shown in inoperative, lowered position, the various endless roller chains being shown in diagrammatic lines for the purpose of clarity;

FIGURE 3 is a similarly enlarged, fragmentary, top plan view;

Figure 1:
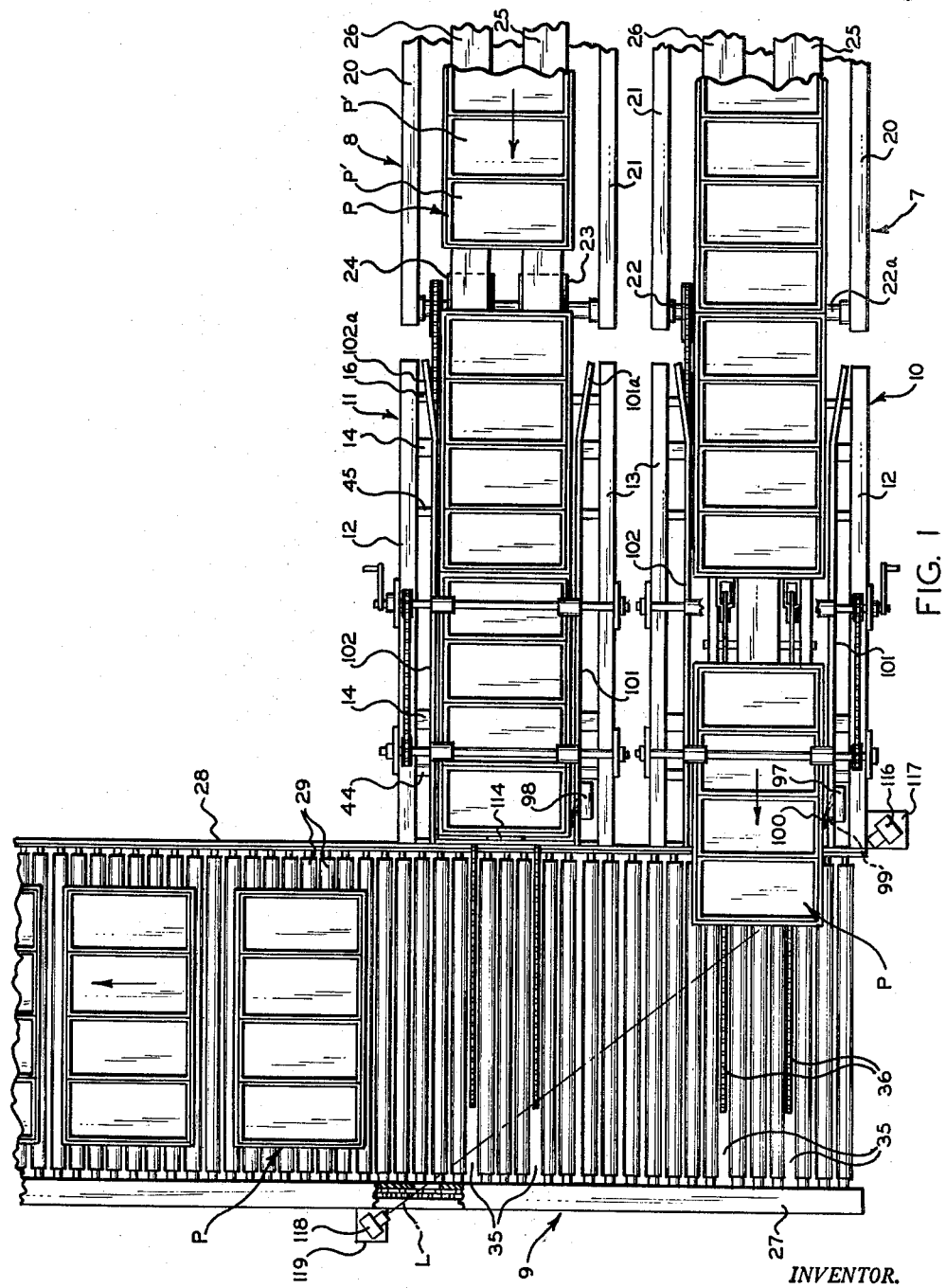
FIGURE 1 is a top plan view of the transfer apparatus showing a leading pan set in the process of being transferred from one supply conveyor to the receiving conveyor.

Referring now more particularly to the accompanying drawings, wherein only a preferred embodiment of the invention has been shown, a pair of numerals 7 and 8 generally indicate a pair of infeed conveyors, leading from a pair of molder-panners, or the like, and numeral 9 generally indicates a receiving conveyor leading to a rack type proofer or the like. It is between such conveyor members that transfer units generally indicated by the numerals 10 and 11 may be positioned to gently, but without loss of control, transfer pan sets or like articles from the pair of conveyor units 7 and 8 to the receiving conveyor 9. The invention will, of course, have varied uses and the present installation is shown and described only as typical of one manner in which the invention may be very efficiently employed.

Each of the transfer units 10 and 11 is substantially identical and inclueds supporting outer and inner side frame members 12 and 13 which may be connected by cross members 14 and supported on legs or the like (not shown). Mounted in bearings 15a and 16a (FIGURES 2 and 3) are front and rear shafts 15 and 16, respectively, which drive an endless belt or table top conveyor 17 trained around pulleys or sheaves 18 and 19 fixed on the shafts 15 and 16, respectively.

As noted previously, the conveyors 10 and 11 are situated intermediate delivery conveyors 7 and 8 and the powered roll conveyor generally indicated 9 which extends at right angles to the direction of travel of conveyors 7 and 8. Each of the conveyors generally identified by the numerals 7 and 8 is identical and similarly includes outer and inner side frame members 20 and 21, which are suitably connected together by transverse braces and also may be supported on legs or the like. Journaled by each pair of side frame members 20 and 21 in bearings 22 is a front shaft 22a mounting a pair of sheaves or pulleys 23 and 24, as shown, over which endless belt or table top conveyors 25 and 26 are trained. At their rear ends the conveyors 7 and 8 journal similar shafts on which are mounted similar pulleys for supporting the trailing portions of conveyors 25 and 26 in the usual manner. It will be assumed that a motor M-1 (FIGURE 6) is connected through suitable reduction gearing to one of the shafts 22a on each of the conveyors 7 and 8 to drive them continuously in the usual manner and thereby to move pan sets P continuously forwardly toward the conveyors 10 and 11. Each of the pan sets P in the present illustration is made up of four pans P' arranged in side-by-side relation as shown and it will be noted that the conveyor 17 in each instance is located longitudinally generally intermediate the conveyors 25 and 26 to receive pan sets P therefrom.

The conveyor 9 is preferably a powered roll conveyor having outer and inner side frame members 27 and 28 supported by legs or the like in any suitable manner and journaling conveyor rolls 29, which as shown have reduced ends or journals 29a received by the supporting side members 27 and 28. It will be noted that the inner side frame member 28 which can be anchored to the front brace member 14 terminates below the upper peripheral surface of rolls 29. The outer frame member 27, however, extends substantially above the upper surface of rolls 29.

Mounted on the outer ends 29a of each of the rolls 29 are sprockets 30 around which an endless chain 31 is trained and any suitable motor M-2 (FIGURE 6) may be connected through suitable speed reduction gearing to drive the chain 31 continuously in the usual manner at a speed which can be varied but typically will move the pan sets P about twice as fast as the pan sets P move on conveyors 7 and 8.

Figure 4:
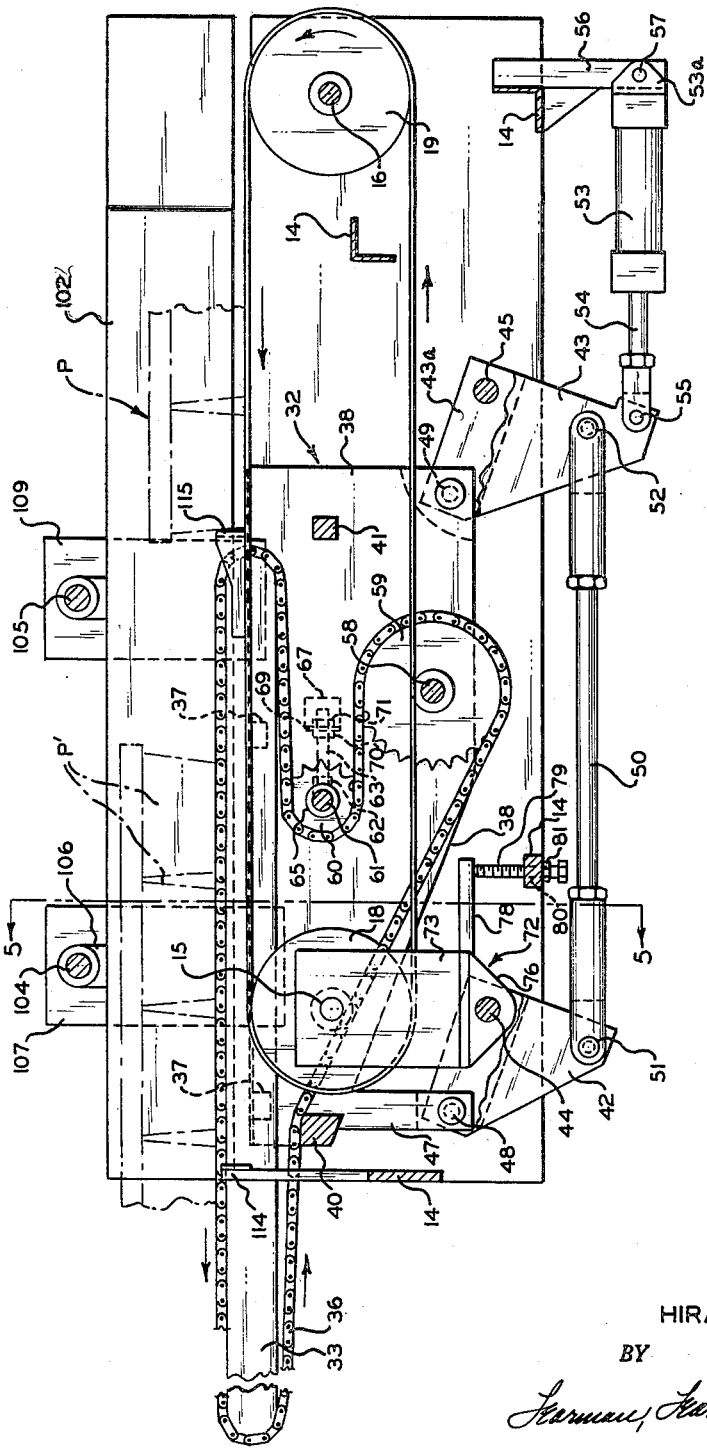
FIGURE 4 is a still more enlarged, sectional, elevational view taken on the line 4—4 of FIGURE 3 with the one transfer conveyor in raised position.

For transferring the pan sets P gently from the conveyors 17 to the conveyor 9 in a manner which precludes their jamming on conveyor unit 9, each transfer unit 10 and 11 is provided with a delivery conveyor assembly generally designated 32 which includes a pair of elongate conveyor guides 33 extending through slotted openings 34 (FIGURE 3) in the conveyor 9 side frame member 28 and into spaces 35 provided between certain adjacent rolls 29. The guides 33, which support endless chains 36, are supported by blocks 37 (FIGURE 5) anchored on the side rails 38 and 39 of the raisable and lowerable delivery conveyor assemblies 32. It will be seen that the plates 38 and 39 are connected by front and rear brace members 40 and 41 (FIGURE 4).

The delivery conveyor assemblies 32 are supported in either raised or lowered position by sets of front and rear bell crank plates 42, 42a and 43, 43a (FIGURES 4 and 5) fixed to shafts 44 and 45, respectively, which are journaled in bearings 46 and 46a, respectively, on the side frame members 12 and 13. Plates 42 and 42a are pivotally connected to dependent front end portions 47, 47a of the side frame members 38 and 39 by pins 48 and plates 43 and 43a are pivotally connected to the rear ends of the side frame members 38 and 39 by pins 49 as shown. Connecting rods 50 connect plates 42 and 43 so that they will be pivoted in unison, pins 51 connecting the front ends of rods 50 to plates 42 and pins 52 pivotally joining the rods 50 to the plates 43. The shafts 44 and 45 support the weight of the delivery conveyor assemblies 32. However, the plates 42 and 43 of the assemblies 32 are actuated by identical double acting air cylinders 53 and 53', each of a type which includes a piston rod 54 pivotally connected to each plate 43 as at 55. The clevis portion 53a of each cylinder 53 and 53' is pivotally supported from a dependent brace 56 fixed to the rearmost brace member 14 by a pin member 57. In FIGURE 4 the piston rod 54 is shown in extended or outward position to dispose the delivery conveyor assembly 32 of unit 10 in raised position and, obviously, when double acting cylinder 53 is actuated to restore the piston rod 54, the delivery conveyor assembly 32 will be moved to the lowered position in which it is shown in FIGURE 2 with the upper surfaces of the chains 36 below the upper surfaces of rollers 29 and table top conveyor members 17.

Supported between the delivery conveyor assembly side plates 38 and 39 are shafts 58 on which drive sprockets 59 are fixed and it will be seen that the delivery conveyor chains 36 pass from the rear ends of guides 33 and around idler sprockets 60 to the sprockets 59. To provide for their fore and aft adjustment the sprockets 59 may be mounted on a shaft 61 having reduced ends which extend through elongated openings 62 in the walls 38 and 39. Threaded members 63 and 64, provided exteriorly of the walls 38 and 39, mount bearings 65 and 66 which are provided to journal the ends of the shaft 70. Angle brackets 67 and 68 fixed on the walls 38 and 39 include openings 69 through which the threaded members 63 and 64, respectively, extend so that sprockets 60 may be adjusted longitudinally to take up slack in the chains 36, and nuts 70 and 71 serve to maintain the longitudinal position of the threaded members 63 and 64.

Front pulley (18) support assemblies generally designated 72 (FIGURE 5), and including side plates 73 and 74 joined by cross members 75, have dependent journals 76 and 77 through which the shafts 44 extend. To brace the assemblies 72 in adjusted position members 78 extend rearwardly from the cross members 75 and are engaged by bolts 79 which permit adjustment of the angular position of the shafts 15 and pulleys 18 relative to shafts 44. The bolt members 79 extend through openings 80 in one of the cross supports 14 of each transfer unit 10 and 11 and can obviously be adjusted as desired, nuts 81 being employed to secure the bolt members 79 in adjusted position.

The conveyors 33 are continuously driven from the shaft 16 which drives each conveyor 17 through the medium of a sprocket 82 (FIGURES 2 and 3) fixed on each shaft 16 and a sprocket 83 fixed on the one end of each shaft 58. Chains 84 are trained around sprockets 82 and 83 and, because sprockets 83 move upwardly and downwardly with the delivery conveyor sub-assemblies 32, spring pressure take-up sprockets 85 are provided as shown in FIGURE 2. Blocks 86 fixed on one of the angle cross members 14 pivotally support arm members 87 as at 88 and sprockets 85 are rotatably supported on the front ends of arm members 87 on pins 89 as shown. Coil springs 90 in a state of tension are secured as at 91 to the arm members 87 and as at 92 to spring supports 93 and function to urge the arms 87 downwardly with sufficient force to take up any slack in the chains 84 when the conveyor assemblies 32 are in lowered position as well as when they are in raised position.

Shafts 16 can be driven from the shafts 22a of conveyor 7 or 8 through the medium of sprockets 94 and 95 fixed on the shafts 16 and 22a, respectively, and chains 96 which are trained around the sprockets 94 and 95.

Multiple contact limit switches 97 and 98 control the operation of the delivery conveyor assembly 32 of each transfer unit 10 and 11. Each of the common limit switches 97 and 98 is identical and includes a spring returned, depressable member 99 and an inwardly extending leaf member 100 which extends into the path of the pan sets P sufficiently so that, when the pans P are moving past the limit switches as the leading pan set P on conveyor unit 10 is doing in FIGURE 1, the leaf member 100 is moved outwardly by the pan set P to depress the plunger 99 of the limit switch 97 or 98. Each of the conventional limit switches 97 and 98 includes a set of normally open and normally closed contacts which will be presently placed in the circuit of FIGURE 6 and it is important to note that each of the limit switches 97 and 98 is mounted on particular guide members which will now be mentioned.

Figure 5:
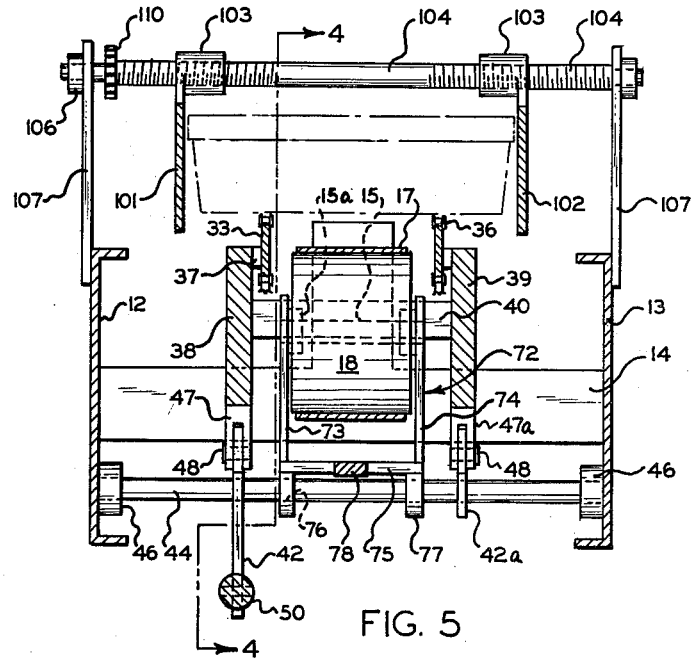
FIGURE 5 is a transverse, sectional view taken on the line 5—5 of FIGURE 4.

As shown particularly in FIGURES 3–5, each of the transfer units 10 and 11 has a pair of pan guide plates 101 and 102, the pan guides 101 mounting the limit switches 97 and 98. Each of the pan guides 101 and 102, which include rearwardly flared portions 101a and 102a at their rear ends, is provided with nut members 103 as shown in FIGURE 5 which are threaded to receive front and rear, threaded adjusting shafts 104 and 105. The threaded adjusting shaft 104 is journaled in bearings 106 provided on support plates 107 (FIGURE 4) extending upwardly from side frame members 12 and 13 and the threaded shaft 105 is journaled by bearings 108 provided on support plates 109 which also extend upwardly from the side frame members 12 and 13. Fixed on the shafts 104 and 105 are sprockets 110 and 111, respectively, which connect the shafts 104 with the shafts 105 through the medium of chains 112 and, as shown in FIGURES 1 and 3, handles 113 can be fixed on the outer ends of the shafts 105 to facilitate manual rotation of the shafts 105 and 104. The threaded portions on the shafts 104 and 105 at opposite ends are of opposite hand so that upon rotation of shafts 104 and 105 the guides 101, 102 of each unit 10 and 11 will be moved together inwardly or outwardly as desired, dependent on the direction in which handles 113 are moved. Thus, regardless of the position of guide members 101, because switches 97 and 98 are mounted thereon, the pans P' are certain to actuate them in the desired manner.

Mounted on the front cross brace member 14 (FIG-

URE 4) of each transfer unit 10 and 11 is a stop 114 which, when the particular delivery conveyor assembly 32 is in lowered position, is in a position to stop the pan sets from proceeding to conveyor 9. As shown in FIGURE 4, when the delivery conveyor chains 36 are in raised position their upper surface is above the level of the fixed stop member 114 and the pan sets are free to proceed to unit 9. Stop members 115 are also fixed on the rear ends of guides 33 and it will be observed from an inspection of FIGURE 2 that, when guides 33 are in "down" position, stops 115 are disposed below the level of the upper surface of conveyor 17. The specific function of stops 114 and 115 will become apparent when the operation of the transfer apparatus is described presently in detail.

A conventional electric eye assembly which includes a light source 116 supported on a plate 117 mounted on the front end of the side frame channel 12 is provided on transfer unit 10 as shown in FIGURE 1. The assembly includes also a photoelectric cell 118 mounted on a plate 119 fixed on the outer support channel 27 of roller conveyor unit 9 which is provided substantially opposite the side channel members 13 of the conveyor unit 11 and it will be seen that the light beam L passing from unit 116 to 118 is diagonally arranged with respect to conveyor unit 9 and obviously is interrupted much sooner by pan sets P on the conveyor unit 10 than by pan sets P on the conveyor unit 11. The specific function of the electric eye assembly units 116 and 118, which may be of the well known De-Tec-Tron type, will also be explained during the detailed description of the operation of the transfer apparatus of the invention and it is to be understood that each has a relay or switch operable upon breaking of the light beam.

Figure 6:
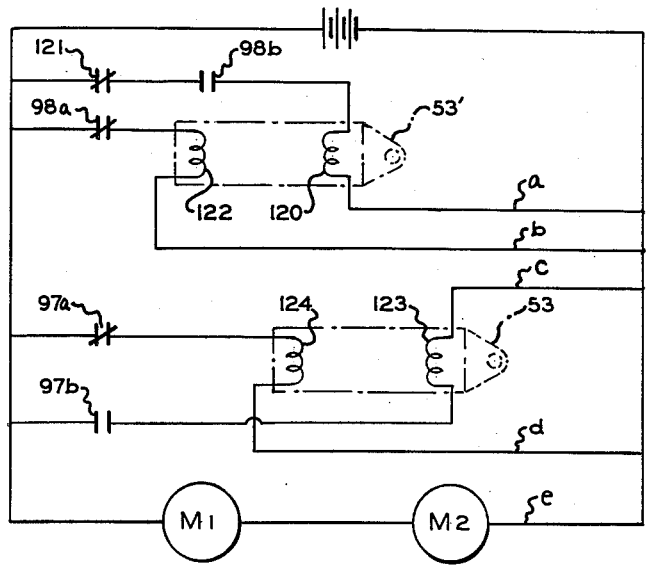
FIGURE 6 is a schematic view indicating a typical electrical control system which may be employed.

In FIGURE 6 I have schematically depicted an electrical control system which could be employed with the apparatus. As noted previously, the double acting pneumatic cylinders 53 and 53' are conventional double acting pneumatic cylinders which may be Bellows air motors of the "Electroaire" type such as manufactured by the Bellows Company of Akron, Ohio (Model BEM5C-60).

In FIGURE 6 a circuit line a connects the advance solenoid 120 of cylinder 53' with the power source and it will be seen that the normally open contacts 98b of limit switch 98 are connected in circuit line a, as are the normally closed contacts 121 of the electric eye assembly which are opened when the light beam L is broken. The circuit line b includes the retract solenoid 122 of double acting cylinder 53' and the normally closed contacts 98a of limit switch 98. Connected in the circuit line c is the advance solenoid 123 of double acting cylinder 53 and the normally open contacts 97b of limit switch 97. In circuit line d the retract solenoid 124 is in series with the normally closed contacts 97a of limit switch 97. Circuit line e may connect to motor M-1 for continuously driving the conveyor units 7 and 8 and a motor M-2 for continuously driving the rolls of conveyor unit 9, and a push button 125 may be provided in circuit line e for starting and stopping the electrical system.

In operation, pan sets P feed from the continuously operating endless conveyors 25 and 26 of conveyor units 7 and 8 to the continuously operating endless conveyors 17 of conveyor units 10 and 11. The pan sets P may proceed forwardly on the conveyors 17 until they are halted by stops 114. However, just before such pan sets P reach stops 114 they force the leaf portions 100 of the limit switches 97 and 98 outwardly to depress the plungers 99 of the switches. If, at this time, the light beam L remains uninterrupted to indicate that the rolls 29 forwardly of conveyor units 10 and 11 are clear, the normally open contacts 97b and 98b of switches 97 and 98 are closed and, with normally closed contact 121 in closed position, the advance solenoids 120 and 123 of cylinders 53' and 53, respectively, are energized. At the same time, the normally closed contacts 97a and 98a of the limit switches 97 and 98 are opened. Thus the piston rods 54 of both cylinders 53 and 53' are driven forwardly to raise the delivery conveyor assemblies 32 of both conveyor units 10 and 11. Since conveyor chains 36 travel continuously and are disposed above the level of stops 114 as shown in FIGURE 4, when the delivery conveyor assemblies are in raised position, the pan sets P are transported to the power roll conveyor unit 9. Once the piston rod of cylinder 53 has been moved to advanced position, the delivery conveyor sub-assembly 32 of conveyor unit 11 will remain raised even though the beam L is broken by the pan sets P being delivered by the conveyor chains 36 of unit 10 which, as shown in FIGURE 1, will almost immediately interrupt the beam L. Mere opening of the normally closed contacts 121, when this occurs, will, of course, not operate to return to return the piston rod of cylinder 53' since energization of retract solenoid 122 is required for this.

During the time that the leading pan sets P are moving forwardly on the delivery conveyor chains 36, the stops 115 prevent the following pan sets from moving forwardly as shown in FIGURE 4. When the leading pan sets P on delivery conveyor chains 36 have passed beyond the actuator leaves 100 of limit switches 97 and 98 the plungers 99 will be restored to position and the normally closed contacts 98a and 97a are free to return to closed position. Also, normally open contacts 97b and 98b will be opened. The energization of solenoids 122 and 124 will operate to restore the piston rods 54 of cylinders 53 and 53' to original position and lower delivery conveyor assemblies 32. By the time this has occured, the pan sets P have been carried over to the position shown in FIGURE 1, in which they space from the outer side rail 27 of the roll conveyor unit 9.

It may happen that in the course of the operation of the transfer device a pan set P proceeding from unit 10 will break the light beam L prior to the time that a pan set P on delivery conveyor unit 11 depresses the actuator leaf 100 of limit switch 98. Since normally closed contacts 121 in circuit lines "a" are immediately opened when light beam L is broken, solenoid 120 cannot be energized and the delivery conveyor assembly 32 of conveyor unit 11 will be raised until such time as the light beam L is again uninterrupted and contacts 121 are closed. In place of the photocell assembly a timer arrangement could be employed.

It should be apparent that I have invented a highly practical transfer device which can operate to feed pan sets from several conveyors to a single receiving conveyor efficiently and without danger of the pan sets jamming on the receiving conveyor, and accordingly can effectively increase the operating capacity of units such as proofers.

It is to be understood that the drawings and descriptive matter are in all cases to be interpreted as merely illustrative of the principles of the invention rather than as limiting the same in any way since it is contemplated that various changes may be made in the various elements to achieve like results without departing from the spirit of the invention or the scope of the appended claims.

I claim:

1. In transfer apparatus for moving articles such as pans of dough from one path of travel to a path of travel angularly disposed thereto; a first conveyor surface; a second conveyor surface extending across the end of the first surface and leading angularly therefrom; a transfer conveyor, extending parallel to said first conveyor surface and mounted for up and down movement, leading from said first conveyor surface to said second conveyor surface; means for raising and lowering said transfer conveyor; and a stop operated by said transfer conveyor for halting the travel of following articles when the said transfer conveyor is in raised position and transferring leading articles from said first conveyor surface to said second conveyor surface.

2. The combination defined in claim 1 in which the said transfer conveyor comprises an endless member trained around a guide which mounts said stop.

3. The combination defined in claim 2 in which a second stop is associated with said first conveyor surface forwardly of the first mentioned stop at the said end of said first conveyor surface; said endless member in raised position being disposed above the level of said second stop.

4. In transfer apparatus for moving articles such as pans of varying length from one path of travel to a path of travel angularly disposed thereto; a first conveyor surface; at least one laterally movable side guide for said first conveyor surface; switch means including an operating part carried by said guide extending inwardly therefrom into the path of pans traveling on said first conveyor surface; a second conveyor surface leading angularly from said first conveyor surface including a portion ahead of said first conveyor surface; means for moving articles from said first conveyor surface to said second conveyor surface; and means operated upon actuation of said operating part of the switch means by an article for actuating said latter means.

5. The combination defined in claim 4 in which a screw member mounts said side guide; and means for turning said screw member to vary the position of said side guide.

6. The combination defined in claim 4 in which a photoelectric assembly including a light beam source and photocell, one provided adjacent the side guide and the other on said second conveyor surface, passes a beam diagonally of said second conveyor surface to indicate when the second conveyor surface ahead of said first conveyor surface is clear of articles; said switch means and photoelectric assembly being electrically interconnected so that said means operated upon actuation of said switch means can operate only when the light beam is uninterrupted.

7. In a transfer unit for mounting between a delivery conveyor and a receiving conveyor lying generally crosswise to the delivery conveyor but spaced therefrom; frame means; a surface thereon bridging said delivery and receiving conveyors for receiving articles from said delivery conveyor; and transfer conveying means intermittently operative only when the receiving conveyor surface immediately ahead is clear of articles to transmit articles from said conveyor surface to said receiving conveyor.

8. The combination defined in claim 7 in which a stop means is provided on said frame means extending above said surface; and said transfer conveying means extends longitudinally with said surface and is raisable to a position above said stop means to transfer articles over said stop means to said receiving conveyor.

9. The combination defined in claim 7 in which said transfer conveying means mounts a stop which when the transfer conveying means is operative prevents following articles from moving to said transfer conveying means.

10. The combination defined in claim 7 in which photoelectric cell assembly means determines whether said receiving conveyor is clear and said transfer conveying means is to operate.

11. In transfer apparatus; a pair of delivery conveyors; a receiving conveyor; a pair of transfer units generally longitudinally aligned with said delivery conveyors for transferring articles to said receiving conveyor; said receiving conveyor lying crosswise to said transfer units; and means for operating said transfer units in unison or separately, dependent on whether the receiving conveyor adjacent said units is clear.

12. In transfer apparatus for moving articles such as pans of dough from one path of travel to a path of travel angularly disposed thereto; longitudinally extending delivery conveyor means; receiving conveyor means lying generally crosswise to the delivery conveyor means; said delivery conveyor means including an end surface adjacent to said receiving conveyor means to which articles on said delivery conveyor means proceed; transfer conveyor means extending longitudinally alongside said end surface generally crosswise to said receiving conveyor means and mounted for vertical movement relative to said end surface; and means for raising and lowering said transfer conveyor means from a position below said end surface to a raised position alongside it to transfer articles from said end surface to said receiving conveyor means.

13. The combination defined in claim 12 in which said transfer conveyor means intersects said receiving conveyor means.

14. The combination defined in claim 13 in which said receiving conveyor means comprises a powered roll conveyor and said transfer conveyor means comprises endless chain conveyors with the leading ends thereof extending between rolls of said powered roll conveyor.

15. The combination defined in claim 12 in which stop means which extends above said end surface is provided in the path of articles received on said end surface; and said transfer conveyor means is raisable to a position above said stop means to transfer articles over said stop means to said receiving conveying means.

16. The combination defined in claim 12 in which said transfer conveyor means is operative to transfer articles only when the receiving conveying means immediately ahead of said end surface is clear of articles.

17. The combination defined in claim 12 in which said delivery conveyor means includes a pair of side-by-side endless conveyors.

References Cited in the file of this patent

UNITED STATES PATENTS

| | | |
|---|---|---|
| 923,356 | Hore | June 1, 1909 |
| 2,372,789 | Mitchell | Apr. 3, 1945 |
| 2,649,951 | Sandberg | Aug. 25, 1953 |
| 2,681,130 | Atwood | June 15, 1954 |
| 2,794,534 | Forrester | June 4, 1957 |